United States Patent Office 2,719,157
Patented Sept. 27, 1955

2,719,157

PROCESS OF SYNTHESIZING PTEROYLGLUTAMIC ACID

Shojiro Uyeo and Masao Tomita, Sakyo-ku, Kyoto-shi, and Tokuo Kubota, Naruo, Naruo-mura, Muko-gun, Hyohgo Pref., Japan, assignors to Shionogi & Co., Ltd., Osaka, Japan No Drawing. Application June 20, 1951, Serial No. 232,671

4 Claims. (Cl. 260—251.5)

This invention relates to an improved process of synthesizing pteroylglutamic acid; characterized in that 2,4,5-triamino - 6 - hydroxypyrimidine, p - aminobenzoyl - l - (+)-glutamic acid and a trihaloacetone or its hydrate are allowed to react in an aqueous medium in the presence of sodium bisulfite.

It has already been described by Waller et al., Journal of the American Chemical Society, volume 70, page 19 (1948), that "pteroylglutamic acid," more accurately to be described as N-[4-{-[2-amino-4-hydroxy-6-pyrimido (4,5-b)pyrazyl, methyl]amino}benzoyl]glutamic acid according to "Ring Index" nomenclature, is a synthetic product obtainable by condensating 2,4,5 - triamino - 6-hydroxypyrimidine, p-aminobenzoylglutamic acid and α,β-dihalopropionaldehyde.

In the course of the condensation, as it is indicated theoretically, at first dihydropteroylglutamic acid appears to be formed as an intermediate, which is a dihydropyrazyl-type compound, and then this intermediate is oxidized spontaneously in the reaction medium whereby pteroylglutamic acid is obtained. However, this procedure results in extraordinarily poor yield, namely, pteroylglutamic acid of high purity can be obtained merely in a 3-5% yield from ordinary materials. In order to obtain a better result, that is, to accelerate the transformation of the dihydropyrazyl-type intermediate compound to an aromatic pyrazyl-type compound, a modification of the process was investigated whereby oxidizing agents such as iodine or sodium bichromate were added into the reaction mixture. The results of this investigation were not satisfactory: the yield of pteroylglutamic acid was at most twice as much as the amount indicated in Waller's original report (ibid.) (cf. Seeger et al., J. A. C. S. 71, 1753 (1949); Booth et al., J. A. C. S. 71, 2304 (1949)).

The results of these investigations indicated that modification of Waller's method in this manner held little promise of obtaining pteroylglutamic acid in an increased yield.

The use of 1,1,3-trihaloacetone, instead of α,β-dihalopropionaldehyde, in Waller's method has already been described by Hultquist and Dreisbach, (C. A. 42, 7943; U. S. Patent 2,443,165) and Weygand et al., (Ber., 82, 333 (1949)). In view of the fact that pteroylglutamic acid can be obtained directly without producing any intermediates, by the condensation of 2,4,5-triamino-6-hydroxypyrimidine, p-aminobenzoylglutamic acid and a trihaloacetone, this procedure would appear to be preferable to the Waller's method.

An experimental test of this procedure was conducted and its results were as follows:

When 1,1,3-trichloroacetone was introduced, drop by drop, into an aqueous solution of 2,4,5-triamino-6-hydroxypyrimidine and p-aminobenzoylglutamic acid, while the reaction mixture was maintained at a hydrogen ion concentration of pH 4 by addition of sodium bicarbonate, a large quantity of dark coloured resinous substance precipitated which, when purified, yielded, pteroylglutamic acid of 85% purity in a yield of merely 1.4% of the theoretical amount.

After a careful investigation of this procedure, it was found, surprisingly, that 1,1,3-trihaloacetone tends to oxidize aminopyrimidine and that the above mentioned resinous by-products consisted mostly of these oxidation products and polymers. From this, it followed that it is necessary to avoid the oxidation of triaminohydroxypyrimidine to obtain better reaction results.

On the basis of this observation, experiments were conducted to determine the effect of various antioxidants upon the condensation of 2,4,5-triamino-6-hydroxypyrimidine, p-aminobenzoylglutamic acid and 1,1,3-trihaloacetone, it was found that certain antioxidant such as sodium hydrosulfite, l-ascorbic acid did not give satisfactory results. It was found, however, and in accordance with the process of this invention, that addition of a certain different proportion of sodium bisulfite was markedly effective in promoting the condensation reaction. For instance, by dissolving equimolecular amounts of 2,4,5-triamino-6-hydroxypyrimidine, p-aminobenzoylglutamic acid and sodium bisulfite in water, and adding thereto an aqueous solution containing the same molecular amount of a trihaloacetone, drop by drop, while maintaining the reaction mixture at room temperature and at a hydrogen ion concentration of pH 4, the yield of pteroylglutamic acid was increased surprisingly compared with the yield obtained when sodium bisulfite was not present. For example, using 1,1,3-trichloroacetone and proceeding as above described, pteroylglutamic acid of 80% purity was obtained in a yield of 37% of the amount theoretically calculated.

It will be obvious from the foregoing that the process of this invention results in obtaining a remarkably increased yield of pteroylglutamic acid as compared with the known method.

The role of the sodium bisulfite in the reaction mechanism of producing pteroylglutamic acid in this way and the reason why the yield of pteroylglutamic acid is so unexpectedly and surprisingly increased is not clear. But it may be that the sodium bisulfite functions, not only as an antioxidant throughout the reaction, but also as a catalyst to effect favorably the condensation of the three reactants to form pteroylglutamic acid.

During the investigations that resulted in the process of this invention, it was found that trihaloacetones, when added to water, form hydrates containing two molecules of water. In order to isolate these dihydrates, a mixture of equal volumes of the trihaloacetone and water may be cooled, causing the dihydrate to separate as a crystalline mass.

The isolated trihaloacetone hydrates are identified by following analytical data:

Calcd. for $C_3H_3OCl_3$—$2H_2O$. Found: C, 18.4; H, 3.7.
Calcd. for $C_3H_3OCl_2Br2H_2O$: C, 14.9; H, 2.9. Found: C, 14.9; H, 2.9.

They, as against unhydrated trihaloacetones, show higher melting point indicated as follows: 1,1,3-trichloroacetone dihydrate melts at 47–48° C. and 1,1-dichloro-3-bromoacetone dihydrate melts at 53–55° C., whereas 1,1,3-trichloroacetone melts at 13.6–15.5° C. and 1,1-dichloro-3-bromoacetone melts at 28–30° C.

These dihydrates may be recrystallised, although they are comparatively soluble in water, from suitable solvent media whereby their purity can be increased.

The above mentioned condensation reaction is conducted in an aqueous solution, hence it follows that the trihaloacetone is present therein as its hydrate, and it does not matter, in the condensation reaction, therefore, whether trihaloacetone, as such, or the equimolecular equivalent of trihaloacetone hydrate is used. However, it has been found that the yields of pteroylglutamic acid depend more or less upon the purity of the trihaloacetone used, thus the use of a purified crystalline hydrate is preferable for the condensation.

*Example I*

To a solution of 1.13 g. of 2,4,5-triamino-6-hydroxypyrimidine, 2.13 g. of p-aminobenzoyl-L-glutamic acid and 1.5 g. of sodium bisulfite in 150 cc. of water was added a solution of 1.3 g. of 1,1,3-trichloroacetone in 60 ml. of water. The hydrogen ion concentration of the resulting mixture was adjusted and maintained at pH 4 throughout the reaction by frequent addition of sodium bicarbonate solution. After standing for ninety-five hours at room temperature, the precipitation was complete. The product was then filtered off and washed with water, alcohol and ether. The crude material was purified twice by re-precipitation according to the method of Waller et al., and 1.30 g. of yellowish-orange crystals were obtained. The purity by chemical assay was about 80%. The substance was reprecipitated once more in a similar manner and the purity was increased to about 92%; yield, 1.04 g. For analysis, it was further reprecipitated thrice and dried at 140° in vacuo for five hours. The dried pale yellow crystals were very hygroscopic and on exposure to air they gained in weight quite rapidly, changing color to yellow. The analyses agreed with values calculated for partially rehydrated material.

*Analysis.*—Calcd. for $C_{19}H_{19}O_6N_7 \cdot 1.5H_2O$: C, 48.6; H, 4.7; N, 20.9. Found C, 48.4; H, 5.0; N, 20.9.

The crystal form, ultraviolet absorption spectrum and paper partition chromatography (Rf, 0 (n-butanol); 0.11 (collidine-lutidine, 1:1); 0.22 (acetic acid-n-butanol-water, 1:4:1); 0.40 (phenol-water-ammonia solution, 80:18:2)) showed the identity of this product with an authentic sample of pteroylglutamic acid.

*Example II*

1.58 g. of 1,1,3-trichloroacetone dihydrate was substituted for 1.3 g. of 1,1,3-trichloroacetone in the process of Example I. (Excepting for the change, the process followed was the same as that of Example I.) The result obtained was quite similar to that of Example I.

*Example III*

To a solution of 1.13 g. of 2,4,5-triamino-6-hydroxypyrimidine, 2.13 g. of p-aminobenzoyl-l(+)-glutamic acid and 1.5 g. of sodium bisulfite in 150 cc. of water was added a solution of 1.94 g. of 1,1-dichloro-3-bromoacetone dihydrate in 60 ml. of water. The procedure followed thereafter was substantially similar to that of Example I and 511 milligrams of pteroylglutamic acid of about 80 per cent purity was obtained.

Having thus described the subject matter of this invention, what it is desired to secure by Letters Patent is:

1. Process for making a high-purity pteroylglutamic acid product that comprises condensing together, in an aqueous reaction medium having a hydrogen ion concentration maintained throughout the condensation reaction at about pH 4, substantially equimolecular proportions of 2,4,5-triamino-6-hydroxypyrimidine, 4-amino-benzoyl-glutamic acid and a substantially pure substance chosen from the group consisting of 1,1,3-trichloroacetone, 1,1,3-trichloroacetone dihydrate, and 1,1-dichloro-3-bromoacetone dihydrate as condensation reactants, in the presence of a like molecular proportion of sodium bisulfite and recovering the pteroylglutamic acid product from the reaction mixture.

2. Process for making a high-purity pteroylglutamic acid product that comprises condensing together, in an aqueous reaction medium having a hydrogen ion concentration maintained throughout the condensation reaction at about pH 4, substantially equimolecular proportions of 2,4,5-triamino-6-hydroxypyrimidine, 4-amino-benzoyl-glutamic acid and substantially pure 1,1,3-trichloroacetone as condensation reactants, in the presence of a like molecular proportion of sodium bisulfite and recovering the pteroylglutamic acid product from the reaction mixture.

3. Process for making a high-purity pteroylglutamic acid product that comprises condensing together, in an aqueous reaction medium having a hydrogen ion concentration maintained throughout the condensation reaction at about pH 4, substantially equimolecular proportions of 2,4,5-triamino-6-hydroxypyrimidine, 4-amino-benzoyl-glutamic acid and substantially pure 1,1,3-trichloroacetone dihydrate as condensation reactants, in the presence of a like molecular proportion of sodium bisulfite and recovering the pteroylglutamic acid product from the reaction mixture.

4. Process for making a high-purity pteroylglutamic acid product that comprises condensing together, in an aqueous reaction medium having a hydrogen ion concentration maintained throughout the condensation reaction at about pH 4, substantially equimolecular proportions of 2,4,5-triamino-6-hydroxypyrimidine, 4-amino-benzoyl-glutamic acid and substantially pure 1,1-dichloro-3-bromoacetone dihydrate as condensation reactants, in the presence of a like molecular proportion of sodium bisulfite and recovering the pteroylglutamic acid product from the reaction mixture.

References Cited in the file of this patent

UNITED STATES PATENTS

| | | |
|---|---|---|
| 2,443,165 | Hultquist et al. | June 8, 1948 |
| 2,477,426 | Semb | July 26, 1949 |